United States Patent
Al-Qasim et al.

(10) Patent No.: US 12,152,477 B2
(45) Date of Patent: *Nov. 26, 2024

(54) PRODUCTIVITY, INJECTIVITY, AND SWEEP EFFICIENCY ENHANCEMENT

(71) Applicant: SAUDI ARABIAN OIL COMPANY, Dhahran (SA)

(72) Inventors: Abdulaziz S. Al-Qasim, Dammam (SA); Ali A. Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 500 days.

This patent is subject to a terminal disclaimer.

(21) Appl. No.: 17/647,491

(22) Filed: Jan. 10, 2022

(65) Prior Publication Data

US 2023/0220752 A1    Jul. 13, 2023

(51) Int. Cl.
*E21B 43/16* (2006.01)
*B01D 53/14* (2006.01)
*B01D 53/62* (2006.01)

(52) U.S. Cl.
CPC ........ *E21B 43/164* (2013.01); *B01D 53/1475* (2013.01); *B01D 53/62* (2013.01); *B01D 2251/404* (2013.01); *B01D 2257/504* (2013.01)

(58) Field of Classification Search
CPC ... E21B 43/164; B01D 53/1475; B01D 53/62; B01D 2251/404; B01D 2257/504
USPC ........................................................ 423/279
See application file for complete search history.

(56) References Cited

U.S. PATENT DOCUMENTS

| | | |
|---|---|---|
| 9,074,125 B1 | 7/2015 | Lahalih |
| 2009/0232861 A1 | 9/2009 | Wright et al. |
| 2012/0131973 A1 | 5/2012 | Greenidge et al. |
| 2017/0044884 A1* | 2/2017 | Mahmoud .............. C09K 8/594 |

(Continued)

FOREIGN PATENT DOCUMENTS

WO    2018/011567 A1    1/2018

OTHER PUBLICATIONS

Gíslason, Sigurdur R. et al., "A brief history of CarbFix: Challenges and victories of the project's pilot phase"; Energy Procedia; vol. 146; pp. 103-114; Jul. 2018 (12 pages).

(Continued)

*Primary Examiner* — Anita Nassiri-Motlagh
(74) *Attorney, Agent, or Firm* — Osha Bergman Watanabe & Burton LLP

(57) ABSTRACT

Methods of enhancing productivity of a subterranean wellbore may include introducing a carbonated mixture comprising water and carbonate anions to a target zone of the subterranean wellbore; introducing basaltic particles to the target zone of the subterranean wellbore; contacting the basaltic particles with the carbonated mixture; dissolving at least a part of the basaltic particles with the carbonated mixture to release divalent cations including calcium cations, magnesium cations and ferrous cations; reacting, in the target zone of the subterranean wellbore, the divalent cations with the carbonate anions in the carbonated mixture to produce carbonate minerals; providing stimulus to the basaltic particles and the carbonated mixture to promote the dissolving and the reacting; depositing at least a part of the carbonate minerals to fractures of the target zone; and monitoring the reacting of the divalent cations with the carbonated anions and depositing.

20 Claims, 8 Drawing Sheets

(56) References Cited

U.S. PATENT DOCUMENTS

| | | |
|---|---|---|
| 2017/0190955 A1* | 7/2017 | Mahmoud ................ C09K 8/05 |
| 2018/0265764 A1 | 9/2018 | Hussein et al. |
| 2019/0187386 A1 | 6/2019 | Constantz et al. |
| 2021/0178317 A1 | 6/2021 | Arkadakskiy et al. |

OTHER PUBLICATIONS

Matter, Juerg M. et al., "Rapid carbon mineralization for permanent disposal of anthropogenic carbon dioxide emissions"; Science; vol. 352, Issue 6291; pp. 1312-1314; Jun. 10, 2016 (4 pages).

Gysi, Alexander P. et al., "CO2-water-basalt interaction. Low temperature experiments and implications for CO2 sequestration into basalts"; Geochimica et Cosmochimica Acta; vol. 81; pp. 129-152; Mar. 15, 2012 (24 pages).

Snaebjörnsdóttir, Sandra Ó. et al., "Reaction path modelling of in-situ mineralisation of CO2 at the CarbFix site at Hellisheidi, SW-Iceland"; Geochimica et Cosmochimica Acta; vol. 220; pp. 348-366; Jan. 1, 2018 (51 pages).

\* cited by examiner

PRODUCTIVITY, INJECTIVITY, AND SWEEP EFFICIENCY ENHANCEMENT

BACKGROUND

In order to increase the productivity of a reservoir, several recovery processes may be used. These processes may include the injection of fluids, such as water, into the reservoir to maintain reservoir pressure and drive the reservoir remaining hydrocarbons to production wells. In particular, waterflooding, which is also referred to as an improved oil recovery (IOR) process, may be used to recover hydrocarbons from both sandstone and carbonate reservoirs. The use of waterflooding involves the injection of water into the reservoir to displace or physically sweep residual oil. Waterflooding may result in unproductive oil recovery when the injectant is diverted in permeable zones or fractures of the reservoir.

Additionally, carbon capture and storage or sequestration may be used for the long-term storage of carbon dioxide and other forms of carbon. Carbon dioxide may be injected into depleted reservoirs. Various challenges are encountered during this process. For example, the carbon dioxide may be lost via leakage within subterranean formations. These leaks may occur via depleted zones, zones of relatively reduced pressure (as compared to the wellbore), zones having naturally occurring fractures, or having fracture gradients exceeded by the hydrostatic pressure of the injection fluid, and so forth.

As such, injectant diversion and leaks from depleted permeable zones and fractures are undesirable from a safety, an economical, or an environmental point of view. This is especially true when working with water-bearing formations, such as aquifers that have drinking quality fresh or mineral water. Additionally, the use of plugging materials in these zones may contaminate hydrocarbon production and lead to formation damage.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein are directed to methods of enhancing productivity of a subterranean wellbore. The methods may include introducing a carbonated mixture comprising water and carbonate anions to a target zone of the subterranean wellbore. The methods may further include introducing basaltic particles to the target zone of the subterranean wellbore. The methods may further include contacting the basaltic particles with the carbonated mixture. The methods may further include dissolving at least a part of the basaltic particles with the carbonated mixture to release divalent cations including calcium cations, magnesium cations and ferrous cations. The methods may further include reacting, in the target zone of the subterranean wellbore, the divalent cations with the carbonate anions in the carbonated mixture to produce carbonate minerals. The methods may further include providing stimulus to the basaltic particles and the carbonated mixture to promote the dissolving and the reacting. The methods may further include depositing at least a part of the carbonate minerals to fractures of the target zone. The methods may further include monitoring the reacting of the divalent cations with the carbonated anions and depositing. The methods may optionally also include repeating one or more of the introducing the basaltic particles, the introducing the carbonated mixture, the dissolving, the reacting, the providing the stimulus, the depositing, and the monitoring. In these methods, the carbonate anions are formed by dissolving carbon dioxide in water and the stimulus comprises at least one of infrasonic wave, acoustic wave, ultrasonic wave, and microwave.

Other aspects and advantages of the claimed subject matter will be apparent from the following description made with reference to the accompanying drawings and the appended claims.

DETAILED DESCRIPTION

The use of waterflooding to improve oil recovery depends on the efficient displacement or sweeping of oil from a reservoir. Maximizing oil recovery thus involves improving injectivity in unswept zones of the reservoir and, as waterflooding may be used to sweep oil from permeable zones or fractures, plugging these areas leading to injectant diversion and sweep efficiency. Similarly, leakages from these permeable zones or fractures may hinder carbon capture and storage processes.

As these injectant diversion and leaks from depleted permeable zones and fractures are undesirable from a safety, an economical, or an environmental point of view, a need exists for methods that can be used to plug these zones. There is also a need to control the locations that are to be plugged.

Figure 1:
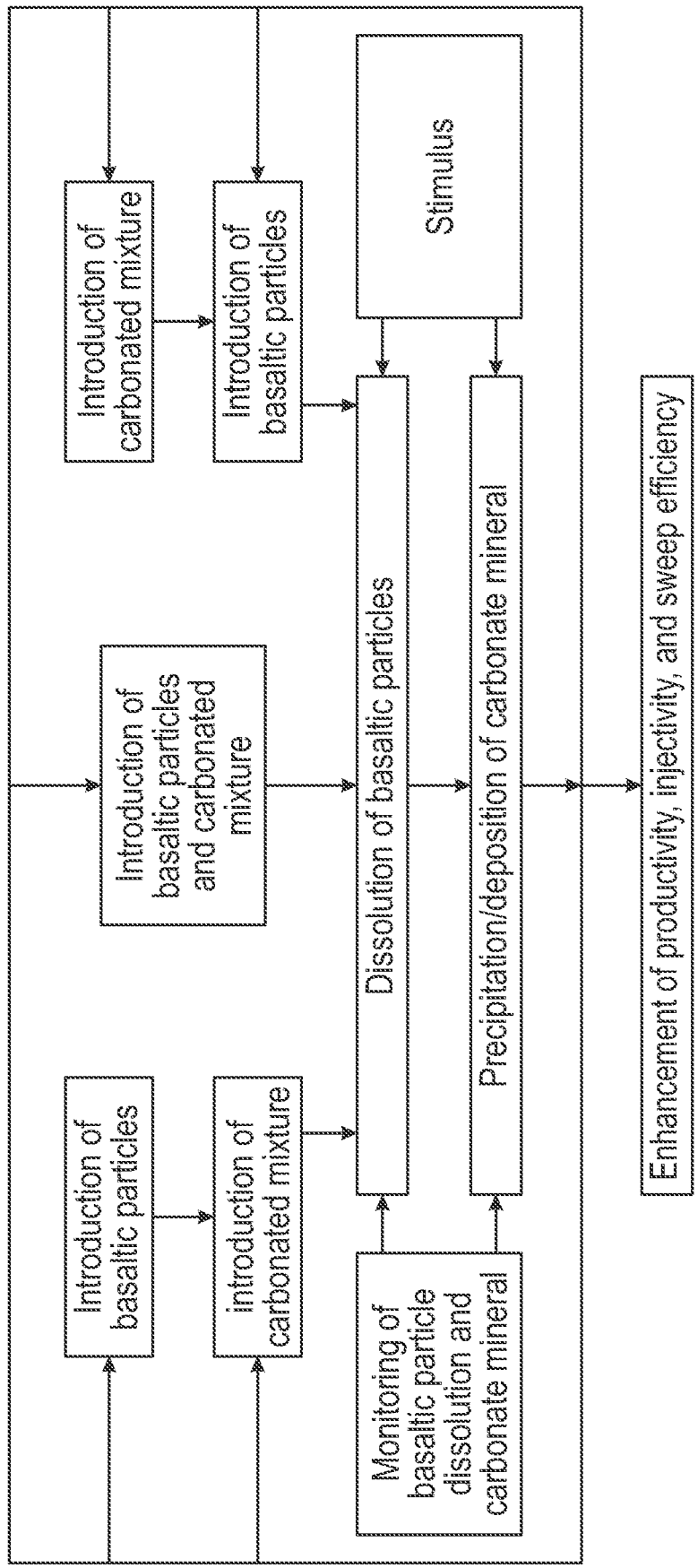
FIG. 1 is a flow diagram that illustrates steps included in the method of enhancing the productivity, injectivity, and sweep efficiency of a subterranean wellbore production in accordance with one or more embodiments.

In one aspect, embodiments disclosed herein relate generally to methods for enhancing the productivity, injectivity, and sweep efficiency of subterranean wellbore production operations through carbon dioxide ($CO_2$) capture and storage. The methods may include introducing basaltic particles and a carbonated mixture into the target zone of the subterranean wellbore, contacting the basaltic particles with the carbonated mixture, dissolving at least a part of the basaltic particles with the carbonated mixture, reacting divalent cations with the carbonate anions in the carbonated mixture to produce carbonate minerals, providing stimulus to the basaltic particles and the carbonated mixture, depositing at least a part of the carbonate minerals to fractures of the target zone, monitoring the reacting and depositing; and optionally repeating one or more of the aforementioned steps. FIG. 1 is a flow diagram illustrating the steps included in the methods of enhancing the productivity, injectivity, and sweep efficiency of a subterranean wellbore production in accordance with one or more embodiments. The details of each step included in the method are described further below.

In accordance with one or more embodiments, the oil and gas production from a reservoir may be enhanced through $CO_2$ capture and storage through a well system including a subterranean wellbore. The reservoir may include a porous or fractured rock formation beneath the earth surface, which may be dry land or ocean bottom. The well system may be for a hydrocarbon well, such as an oil well, a gas well, a gas condensate well, or a mixture of hydrocarbon-bearing fluids. The reservoir may include different layers of rock having varying characteristics, such as degrees of density, permeability, porosity, and fluid saturations. The formation may include a low-pressure formation (for example, a gas-depleted former hydrocarbon-bearing formation) and a water-bearing formation (for example, fresh water, brine, former waterflood). In the case of the well system being operated as a production well, the well system may facilitate the extraction of hydrocarbons (or production) from a hydrocarbon-bearing reservoir. In the case of the well system being operated as an injection well, the well system may facilitate the injection of substances, such as gas or water, into a hydrocarbon-bearing reservoir.

The well system may include a subterranean wellbore including a bored hole that extends from the earth surface into the reservoir. The wellbore may be vertical, deviated, or horizontal. The wellbore may provide for the circulation of injection fluids to displace hydrocarbons within the reservoir. The injection fluid may be pumped into the reservoir forming a propagating flood fluid. Leakage of this flood fluid may occur when the fluid flows from permeable zones or fractures of the reservoir. In the present disclosure, permeable zones or fractures may refer to naturally occurring openings or fissures in the formation, fissures created by the drilling activities, or any other features of the formation in the vicinity of the wellbore which allow the migration of the flood fluid into the formation. The general location where the flood fluid is being lost into the formation may be referred to as a target zone. Leakage may occur at any location in the wellbore between the surface and the bottom of the wellbore and thus, any parts of the wellbore where leakage is occurring may be considered as a target zone.

Basaltic Particles

Figure 2A:
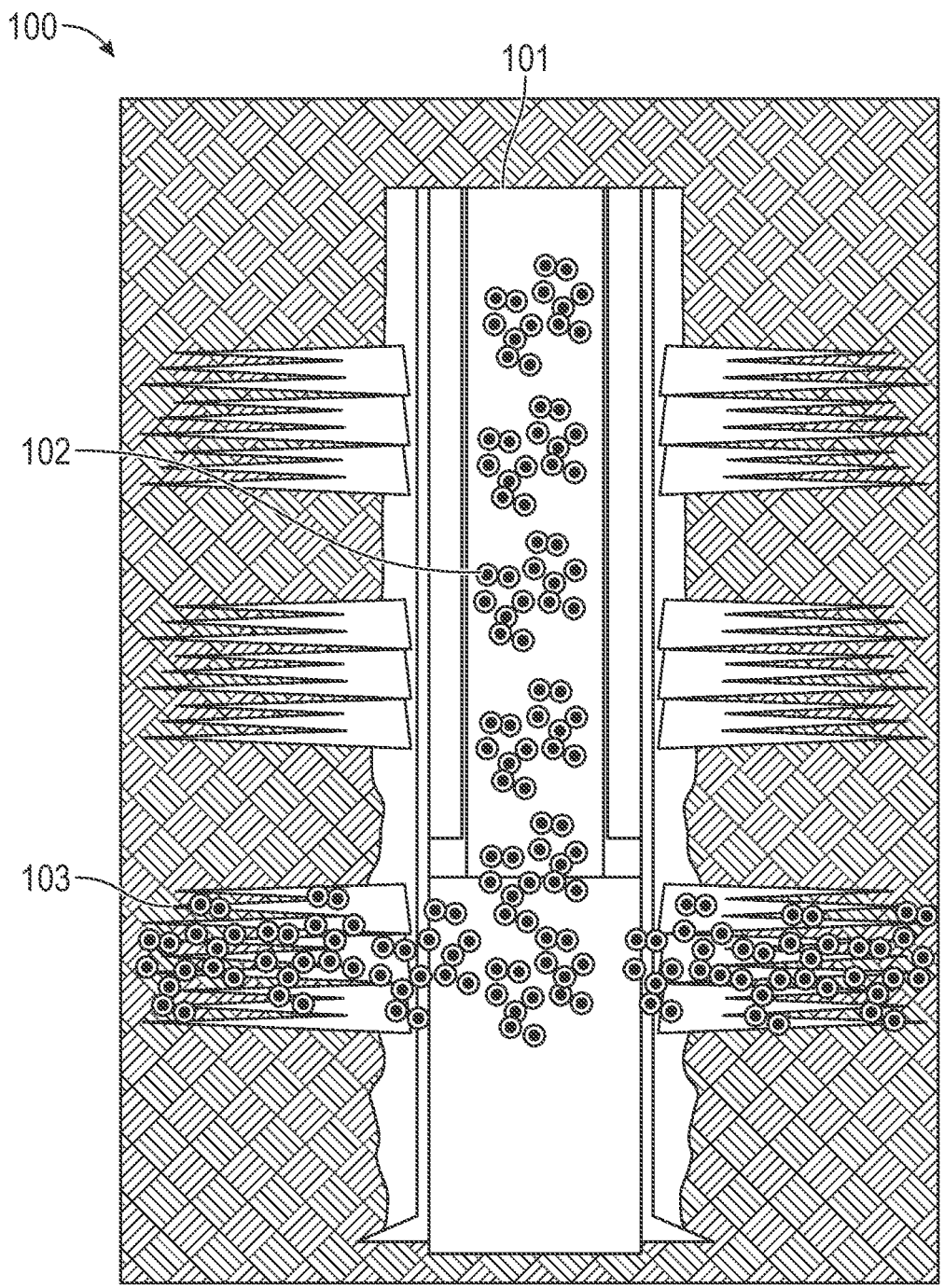
FIG. 2A-2C are diagrams that illustrate the method of enhancing the productivity, injectivity, and sweep efficiency of a subterranean wellbore production in a vertical wellbore in accordance with one or more embodiments.

In one or more embodiments, a method of enhancing the productivity, injectivity, and sweep efficiency of a subterranean wellbore production may include introducing basaltic particles to a target zone of a subterranean wellbore. FIG. 2A illustrates a well environment 100 in which basaltic particles 102 are introduced into the wellbore 101. In some embodiments, the basaltic particles are introduced into target zone 103, where a carbonated mixture is also introduced such that dissolution of the basaltic particles and precipitation of carbonate mineral may take place. In other embodiments, basaltic particles may be introduced to the target zone 103 and other parts in the wellbore.

In one or more embodiments, basaltic particles may include any particles having basalt as a base component. The basaltic particles may include basalt from natural sources, such as volcanic rocks, and may include various types of basalt, such as, but not limited to, tholeiitic basalt, alkali basalt, high-alumina basalt, and boninite. The definition of basalt may be obtained by consulting various classification methods of volcanic rocks, such as Quartz, Alkali feldspar, Plagioclase, Feldspathoid (QAPF) diagrams. In some embodiments, basalt may be an aphanitic, or fine-grained, igneous rock generally containing about 45 wt % to 52 wt % silica, 5-14 wt % FeO, 5-15 wt % of CaO, 5-12 wt % of MgO, and 14 wt % or more of $Al_2O_3$.

In one or more embodiments, the basaltic particles may include basalt and other components, such as pulverized non-basalt rocks and minerals. In some embodiments, basaltic particles may contain basalt in an amount ranging from a lower limit selected from any of 5 wt %, 10 wt % and 15 wt %, to an upper limit selected from any of 60 wt %, 70 wt %, 80 wt %, 90 wt % and 100 wt %, where any lower limit may be used in combination with any upper limit.

In one or more embodiments, the basaltic particles may be in a form of, but not limited to, nano-sized particles, chips and fibers. The shape of the basaltic particles may be spherical, cubic, cylindrical or any other regular or irregular shapes. In some embodiments, the basaltic particles may have a size ranging from about 1 nm to 20 mm for basaltic particles, such as a lower limit selected from any of 1 nm, 5 nm, 10 nm, 50 nm, and 100 nm to an upper limit selected from any of 0.5 µm, 1 µm, 10 µm, 100 µm, 1 mm, 2 mm, 5 mm, 10 mm and 20 mm, where any lower limit may be used in combination with any upper limit.

Introduction of Basaltic Particles

In some embodiments, the basaltic particles may be introduced to the wellbore, including the target zone, by incorporating the basaltic particles into a base fluid. A base fluid containing basaltic particles may be referred to as a basaltic base fluid. The base fluid may be any type of fluid that is suitable for dispersing the basaltic particles and carrying the basaltic particles to be introduced to the target zone of the wellbore. In some embodiments, the basaltic base fluid may contain additional fluids or additives.

In some embodiments, the basaltic base fluid may be produced by incorporating the basaltic particles into an injection fluid. The injection fluid may be water-based, oil-based or other types of fluid. The injection fluid may contain water. The injection fluid may be air-based or based on other gas such as $N_2$.

In one or more embodiments, the basaltic base fluid may contain basaltic particles in an amount ranging from about 1 wt % to 90 wt %. In some embodiments, the basaltic base fluid may contain basaltic particles in an amount ranging from a lower limit selected from any of 1 wt %, 2 wt %, 3 wt %, 4 wt %, and 5 wt % to an upper limit selected from any of 50 wt %, 60 wt %, 70 wt %, 80 wt % and 90 wt %, where any lower limit may be used in combination with any upper limit.

In other embodiments, the basaltic particles may be introduced to the wellbore, including the target zone, by incorporating the basaltic particles into a fluid forming a basaltic base fluid. The basaltic particles may thus be introduced to specific areas of the wellbore, such as the target zone, where the basaltic particles may come into contact with a carbonated mixture, as described in detail below.

In some embodiments, the basaltic particles may be incorporated into a coating fluid to form a coating composition, and coated onto a surface of the wellbore or compartment within the wellbore or portion thereof. The coating composition may include the basaltic particles, the coating fluid and may also include other components such as additives. In one or more embodiments, the coating fluid may be any fluid that is suitable for dispersing the basaltic particles, and that allows the basaltic particles to be incorporated into the wellbore. In one or more embodiments, the coating fluid may be a resin, paint, or adhesive which allow the basaltic particles to be coated onto a surface and sufficiently adhered onto the surface such that the basaltic particles may be introduced to a specific location in the wellbore, including the target zone, without being dislodged accidentally from the surface. In some embodiments, the basaltic particles may be placed onto the surface by various methods such as adhering the basaltic particles to the surface with an adhesive, or securing the basaltic particles onto the surface mechanically by using securing means such as straps, mesh, or fasteners. In some embodiments, the basaltic particles may be embedded into various parts of the surface.

In some embodiments, the method of enhancing the productivity, injectivity, and sweep efficiency of a subterranean wellbore production may include introducing an additive which may accelerate the plugging of the target zone. The additive may include ceramic particles which may be excited by a stimulus, such as microwaves.

In one or more embodiments, the amount of basaltic particles introduced to the wellbore may be adjusted according to the severity of the leakage and other operational factors such as, but not limited to, the flow rate and viscosity of the injection fluid.

Introduction of Carbonated Mixture

In one or more embodiments, a method of enhancing the productivity, injectivity, and sweep efficiency of a subterranean wellbore production may include introducing a carbonated mixture comprising water and carbonate anions to the target zone of the wellbore.

In some embodiments, the carbonated mixture may be produced by dissolving carbon dioxide into water. Dissolution of carbon dioxide in water may result in the formation of ions including hydrogen cations ($H^+$) and carbonate anions ($CO_3^{2-}$). Water in the carbonated mixture may be fresh water or saltwater, and may be obtained from natural sources or artificially produced. In one or more embodiments, the carbonated mixture may be any fluid that contains water and carbonate anions obtained by dissolving carbon dioxide into the water, and is suitable for being introduced to the wellbore.

In one or more embodiments, the carbonated mixture may be carbonated water produced by dissolving carbon dioxide into water to produce carbonated water, and the carbonated water may be introduced directly into the wellbore. In other embodiments, the carbonated mixture may be an injection fluid to which the carbonated water is mixed in before or as being introduced into the wellbore. In yet other embodiments, the carbonated mixture may be an injection fluid to which carbon dioxide is directly dissolved in before or as being introduced to the wellbore.

In some embodiments, the carbonated mixture may be introduced to the target zone after basaltic particles are introduced to the target zone. The basaltic particles may be introduced to the target zone in the form of basaltic-base fluid, such as basaltic particles mixed with a fluid, and the carbonated mixture may be introduced to the target zone after the basaltic-base fluid is introduced to the target zone. In other embodiments, the basaltic particles may be introduced to the target zone by incorporating them into an injection fluid. Carbonated mixture may be then introduced to the wellbore where waterflooding is used to sweep oil from permeable zones or fractures. In other embodiments, the carbonated mixture may be introduced to the wellbore before the basaltic-base fluid containing basaltic particles is introduced to the wellbore. In some embodiments, the carbonated mixture may be introduced into the wellbore continuously or intermittently after flood fluid leakage occurs and until the flood fluid leakage is mitigated.

In one or more embodiments, the carbonated mixture may be acidic and have a pH of about 2.0 to 6.9. In some embodiments, the carbonated mixture may have a pH in a range from a lower limit selected from any of 2.0, 2.5, 3.0, 3.5 and 4.0 to an upper limit selected from any of 4.0, 4.5, 5.0, 5.5, 6.0, 6.5 and 6.9, where any lower limit may be used in combination with any upper limit.

Dissolution of Basaltic Particles in Carbonated Mixture

In one or more embodiments, the method of enhancing the productivity, injectivity, and sweep efficiency of a subterranean wellbore production may include contacting basaltic particles with a carbonated mixture in the target zone of the subterranean wellbore. The basaltic particles may contact the carbonated mixture as the basaltic particles and carbonated mixture are introduced to the target zone. In some embodiments, contacting basaltic particles with carbonated mixture may be achieved by the force of the injection to promote reactivity of the basaltic particles and carbonated mixture.

In one or more embodiments, the method of enhancing the productivity, injectivity, and sweep efficiency of a subterranean wellbore production may include dissolving at least a part of the basaltic particles with the carbonated mixture to release divalent cations. The carbonated mixture containing water and carbonate anions may be acidic and may have the following chemical reactions in equilibrium:

$$H_2CO_3(aq) \leftrightarrows H^+(aq) + HCO_3^-(aq) \qquad \text{equation 1}$$

$$H_2CO_3^-(aq) \leftrightarrows H^+(aq) + HCO_3^{2-}(aq) \qquad \text{equation 2}$$

$H^+$ ions in the carbonated mixture may then dissolve minerals containing divalent cations in the basaltic particles. Divalent cations refer to cations or positive ions with the valence of 2. Such dissolution of basaltic particles may include, but is not limited to, reactions represented by the following:

$$\text{Basalt} + xH^+(aq) \rightarrow Mg^{2+}(aq) + Ca^{2+}(aq) + Fe^{2+}(aq) + \qquad \text{equation 3}$$

$$Mg_2SiO_4 + 4H^+(aq) \rightarrow 2Mg^{2+}(aq) + 2H_2O + SiO_2(aq) \qquad \text{equation 4}$$

$$MgCaSi_2O_6 + 4H^+(aq) \rightarrow Mg^{2+}(aq) + Ca^{2+} + 2H_2O + 2SiO_2(aq) \qquad \text{equation 5}$$

$$CaAl_2SiSi_2O_8 + 8H^+(aq) \rightarrow Ca^{2+}(aq) + 2Al^{3+} + 4H_2O + 2SiO_2(aq) \qquad \text{equation 6}$$

In some embodiments, dissolving the basaltic particles with the carbonated mixture may release divalent cations including calcium cations ($Ca^{2+}$), magnesium cations ($Mg^{2+}$) and ferrous cations ($Fe^{2+}$). Dissolving of the basaltic particles and releasing of the divalent cations may generally occur when the basaltic particles contact the carbonated mixture, and may occur in the target zone.

Stimulation of Basaltic Particles and Carbonated Mixture

Figure 2B:
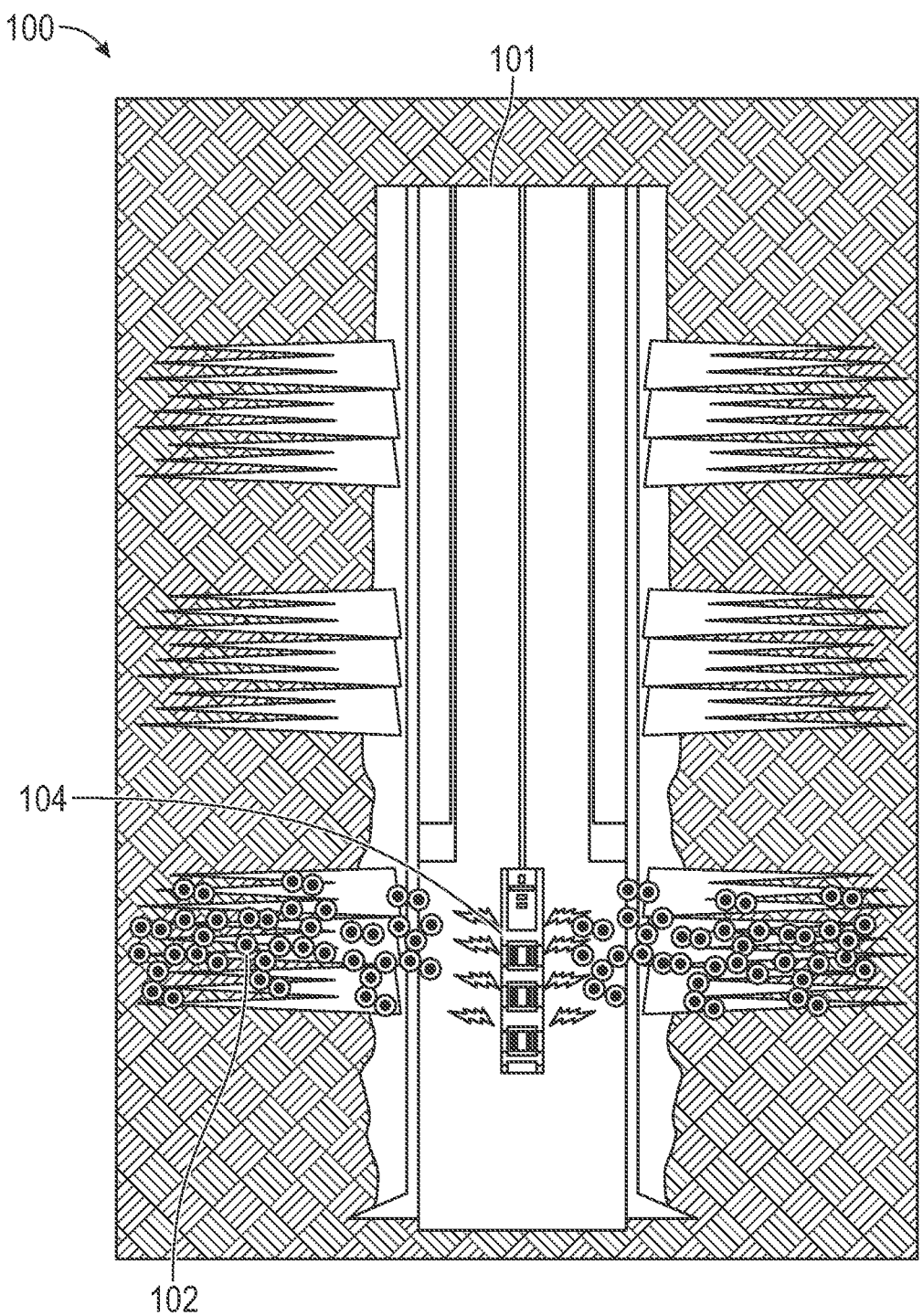

In one or more embodiments, the method of enhancing the productivity, injectivity, and sweep efficiency of a subterranean wellbore production may include providing stimulus to the basaltic particles and the carbonated mixture. Stimulus in the present disclosure may include, but is not limited to, a form of energy such as sound energy and motion energy. In some embodiments, the stimulus may promote dissolving of the basaltic particles and reacting of the divalent cations with carbonate anions, which may result in the acceleration of carbonated mineral precipitation process. FIG. 2B illustrates a well environment 100 in which the basaltic particles 102 and carbonated mixture are introduced to the target zone 103 of the wellbore 101, and a stimulus 104 is being provided.

In some embodiments, the stimulus may be provided as an energy form including infrasonic, acoustic, ultrasonic waves, and microwaves. The stimulus may provide additional agitation to the basaltic particles and carbonated mixture to promote the mixing and contacting of $H^+$ ions with the basaltic particles, contacting of divalent cations with carbonate anions, and migration of $H^+$ ions into the cavities of basaltic particles to increase the dissolution rate of the basaltic particles.

In one or more embodiments, the stimulus may be provided by a stimulus generator, such as an acoustic wave generator, infrasonic wave generator, ultrasonic wave generator, or microwave generator. Such generator may be incorporated into any suitable portion of the wellbore and may located within such portion via wireline placement for example. The stimulus may be provided continuously, or intermittently. There is no limitation on the duration and timing of the stimulation process and the strength of the provided stimulus, and they may be adjusted and optimized based on the specific conditions of the enhanced productivity. These can be placed permanently downhole or can be retrievable and used during the treatment operation.

Precipitation of Carbonate Minerals

In one or more embodiments, the method of enhancing the productivity, injectivity, and sweep efficiency of a subterranean wellbore production may include reacting the divalent cations released from the basaltic particles with carbonate anions ($CO_3^{2-}$) in the carbonated mixture to produce carbonate minerals. Carbonate minerals refer to any compounds that contain at least a carbonate group and are insoluble in water. Compounds "insoluble in water" in the present disclosure include compounds that are completely insoluble in water, and compounds that are slightly soluble in water, such as less than 1 part, less than 0.5 part, less than 0.1 part, less than 0.01 part, less than 0.001 part is soluble in 100 parts of water.

Figure 2C:
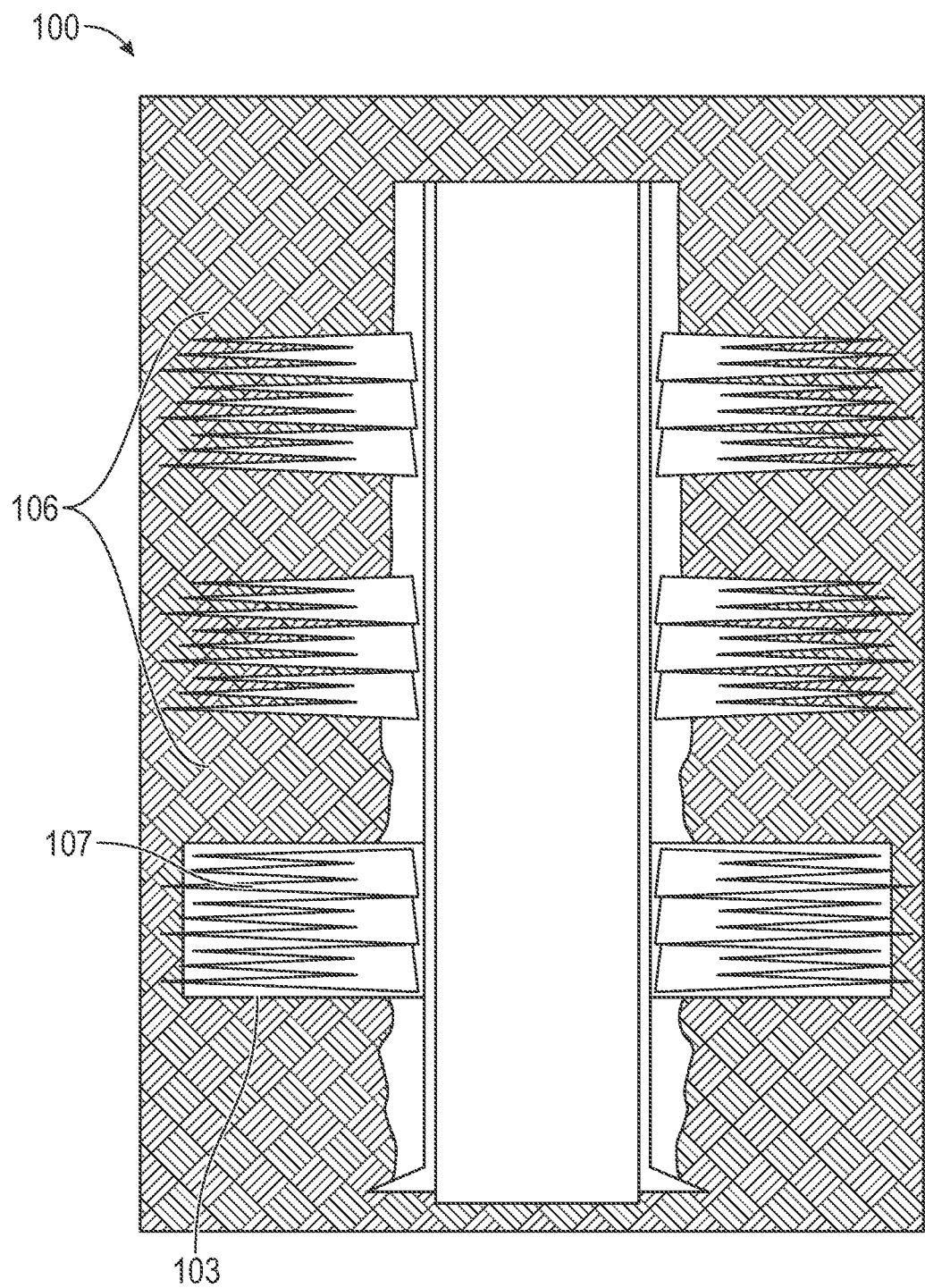

In one or more embodiments, divalent cations, such as $Ca^{2+}$, $Mg^{2+}$, $Fe^{2+}$, may react with $CO_3^{2-}$ in the carbonated mixture upon contact and produce carbonate minerals including calcium carbonate, magnesium carbonate and ferrous carbonate. Because the carbonate minerals are insoluble in water, the carbonate minerals precipitate upon formation. In some embodiments, at least a part of the precipitated carbonate minerals are deposited in various parts of the target zone, including fractures where sweep is performed into the formation. In one or more embodiments, such deposits of carbonate minerals may act as a plug and seal the fractures, enhancing productivity. In one or more embodiments, plugging the leakage may include stopping the loss of fluid into the formation, or reducing the severity of the fluid loss such that production operation may be resumed. FIG. 2C illustrates a well environment 100 in which the formation 106 has sealed fractures 107, enhancing the productivity, injectivity, and sweep efficiency. The sealed fractures 107 are obtained as a result of the carbonate minerals depositing in the fractures in the target zone 103.

In some embodiments, the reaction of divalent cations and carbonate anions may occur immediately after the divalent cations are released from the basaltic particles. In other embodiments, stimulus may be required in order to promote contacting of basaltic particles and carbonate mixture, and dissolving of the basaltic particles such that the reaction rate of divalent cations and carbonate anions may be increased.

Monitoring of Carbonate Mineral Precipitation

In one or more embodiments, the method of enhancing the productivity, injectivity, and sweep efficiency of a subterranean wellbore production may include monitoring the reaction process of divalent cations and carbonate anions and the depositing process of the carbonate mineral. In some embodiments, the monitoring process may include obtaining information regarding the reaction rate of the divalent cations and carbonate anions, and the rate of carbonate mineral precipitation. Such information may be used to determine whether additional basaltic particles, carbonated mixture and/or stimulus are required in order to maintain, accelerate and/or complete the plugging process.

In some embodiments, the monitoring may include collecting samples and manually conducting various tests to obtain necessary information to assess the reaction and precipitation processes. In one or more embodiments, the monitoring may include collecting samples of the injection fluid and conducting tests to obtain properties such as the amount of carbonate mineral, divalent cations and carbonate anions in the injection fluid, and the pH of the injection fluid. In other embodiments, the monitoring may include measuring the amount of injection fluid introduced to the wellbore and the amount returning to assess the level of fracture plugging.

In other embodiments, the monitoring may include incorporating downhole sensors into the wellbore and obtaining properties such as the amount of carbonate mineral, divalent cations and carbonate anions in the fluid such as injection fluid and carbonated mixture, and the pH of the injection fluid. In some embodiments, the monitoring may include observing the precipitation process of carbonate mineral in the target zone by using sensors such as thermal and ultrasonic sensors. The monitoring may be continuous or intermittent.

In one or more embodiments, the monitoring may provide information which may be used to adjust the amount of basaltic particles and carbonated mixture to be introduced to the target zone, and the strength of the stimulus and the duration of the stimulus provision.

In some embodiments, the method of enhancing the productivity, injectivity, and sweep efficiency of a subterranean wellbore production may include, as an option, repeating one or more of introducing basaltic particles, introducing carbonate mixture, contacting, dissolving, reacting, providing stimulus, depositing carbonate mineral and monitoring. In some embodiments, the repeating process may include all steps included in the method of enhancing the productivity, injectivity, and sweep efficiency of a subterranean wellbore production. In other embodiments, selective steps of the method may be repeated. The number of repeats is not limited and may be repeated as many times as necessary until the productivity, injectivity, and sweep efficiency are enhanced. Each repeated process may be the same as the previous iteration, or may be different, and may be adjust in accordance with a specific target for the productivity enhancement.

In some embodiments, the method of enhancing the productivity, injectivity, and sweep efficiency of a subterranean wellbore production may be conducted without stopping the production operation, or with a minimal disruption. A minimal disruption may include halting the production operation for a short period of time, such as 5 minutes, 10 minutes, 30 minutes, or 1 hour.

In some embodiments, the method of enhancing the productivity, injectivity, and sweep efficiency of a subterranean wellbore production may be conducted by incorporating a control device, which may be designed to provide basaltic particles and/or stimulus to a target zone. The control device may be incorporated into any portion of the wellbore via any suitable means such as wireline placement, and the control device may be fixed in one location, or may be mobile and transfer to any portion of the wellbore as necessary.

Plugging of the formation target zone may be conducted without stopping the production operation or with a minimal disruption, by incorporating a mobile control device, regardless of the location of the target zone in the wellbore. In some embodiments, a plurality of control devices may be used. In some embodiments, the control device may include basaltic particles and a stimulus generator providing stimulus in mainly the radial direction of the control device. The control device may also include sensors, a retrieval/deployment line, and a motor.

In some embodiments, the stimulus generator of the control device may include an acoustic wave generator, infrasonic wave generator, ultrasonic wave generator, or microwave generator.

In some embodiments, the control device may be a mobile control device capable of transferring to any location along the wellbore. The movement of the mobile control device may be controlled mechanically by a retrieval/deployment line connected to the mitigation device and a line retrieval/deployment means such as a reel or a winch.

In some embodiments, the control device may contain sensors which may include a camera, scanner, logging and scanning ring, hole caliper, or any other devices which may be used to measure or record various aspects of the downhole environment and the plugging process of the formation target zone. In some embodiments, the monitoring of the target zone may be conducted by the sensors included in the control device.

Figure 3A:
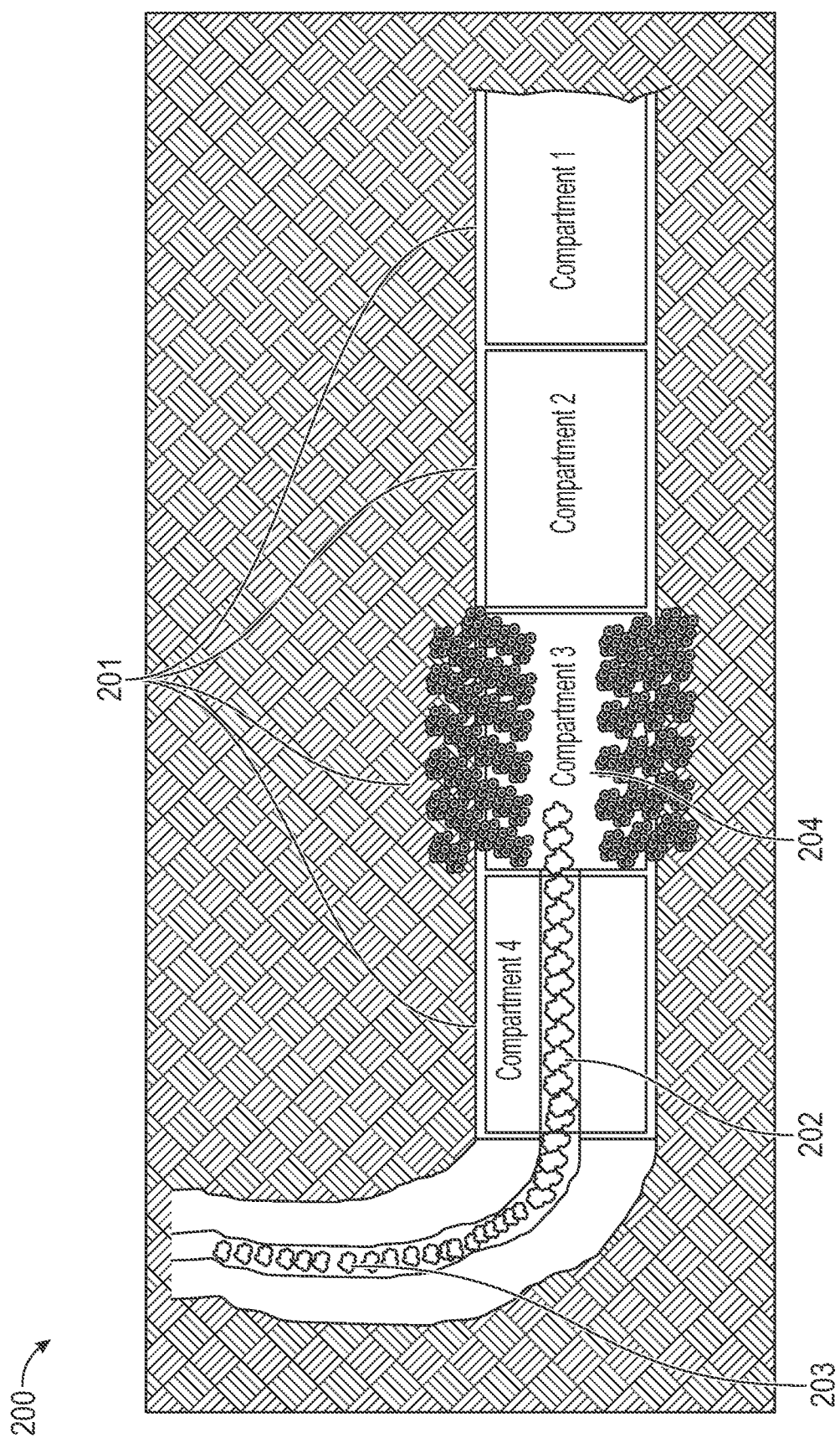
FIG. 3A-3C are diagrams that illustrate the method of enhancing the productivity, injectivity, and sweep efficiency of a subterranean wellbore production in a horizontal wellbore with compartments in accordance with one or more embodiments.
Figure 3B:
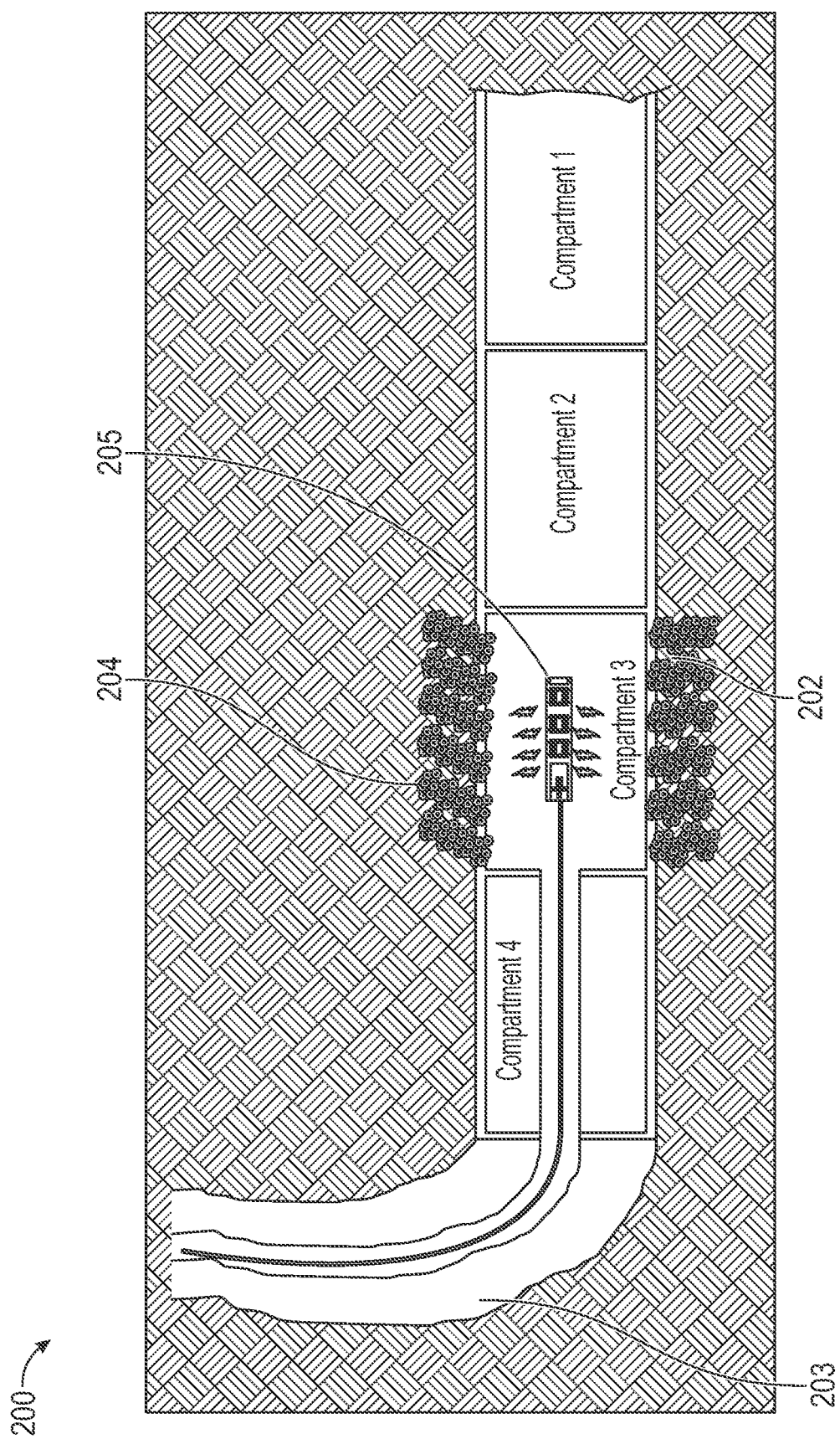
Figure 3C:
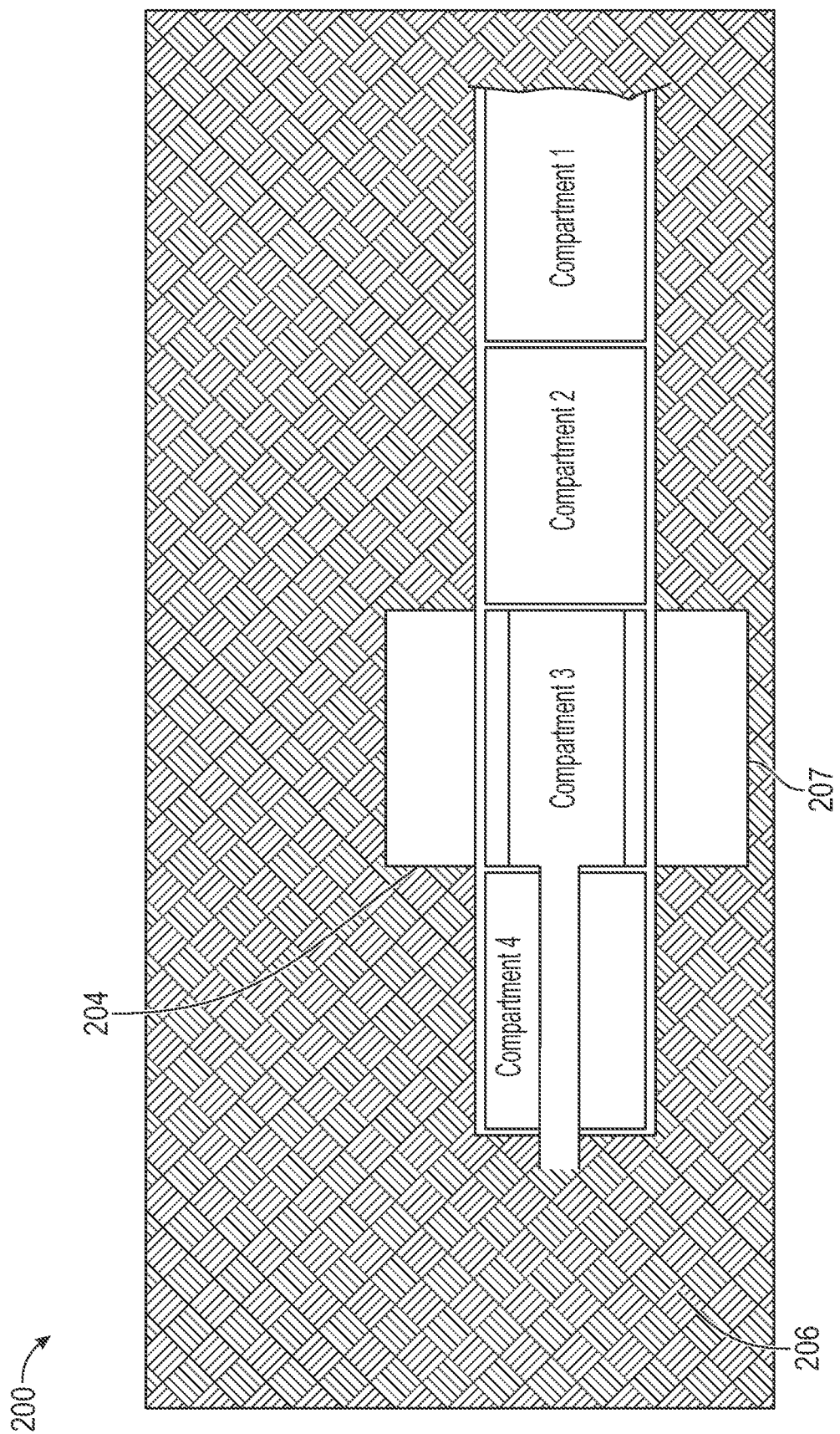

The method of enhancing the productivity, injectivity, and sweep efficiency of a subterranean wellbore production described in the previous paragraphs may be applied to a vertical wellbore or a horizontal wellbore. FIGS. 3A-3C illustrate a method of enhancing the productivity, injectivity, and sweep efficiency of a subterranean wellbore production in a horizontal wellbore in accordance with one or more embodiments.

FIG. 3A illustrates a horizontal well environment 200 having compartments 201 in which basaltic particles 202 are introduced into the wellbore 203. In some embodiments, the basaltic particles are introduced into target compartment 204, where a carbonated mixture is also introduced such that dissolution of the basaltic particles and precipitation of carbonate mineral may take place.

FIG. 3B illustrates a well environment 200 in which the basaltic particles 202 and carbonated mixture are introduced to the target compartment 204 of the wellbore 203, and a stimulus 205 is being provided.

FIG. 3C illustrates a well environment 200 in which the formation 206 has sealed fractures 207, enhancing the productivity, injectivity, and sweep efficiency. The sealed fractures 207 are obtained as a result of the carbonate minerals depositing in the fractures in the target compartment 203.

Figure 4:
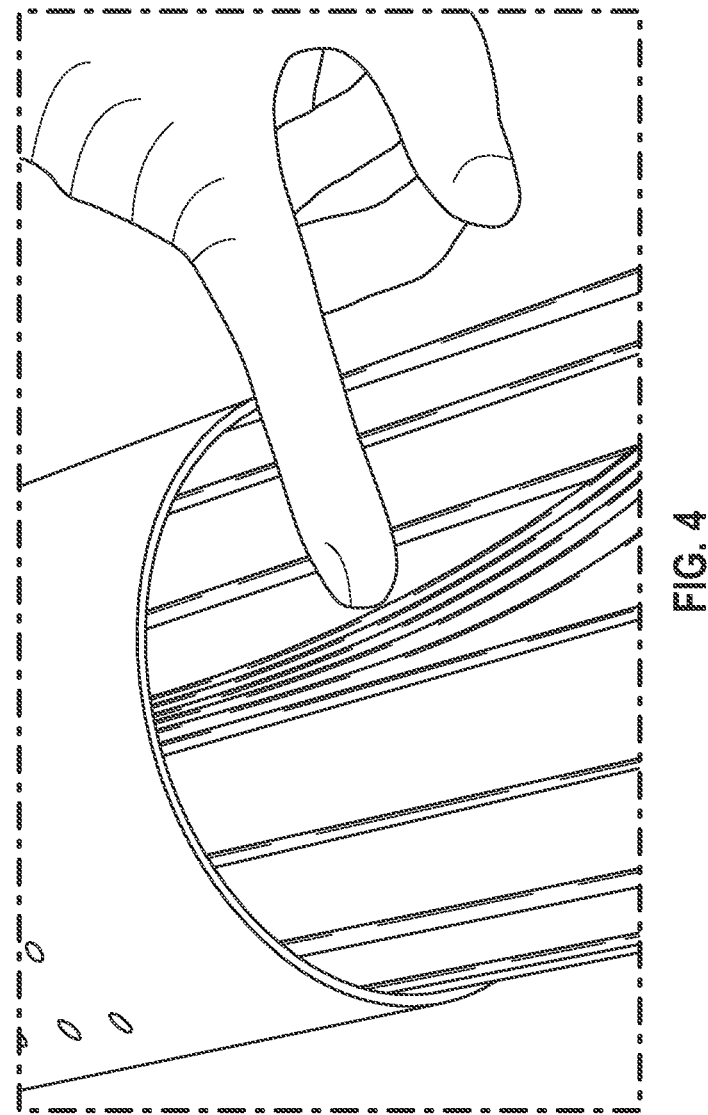
FIG. 4 is a photograph illustrating basalt base fluid coated onto the surface of a compartment of a horizontal wellbore in accordance with one or more embodiments.

FIG. 4 is a photograph illustrating basalt base fluid coated onto the surface of a compartment of a tool that may be disposed via wireline or any other suitable means to a desired reservoir location in accordance with one or more embodiments. Dissolvable chips may be placed permanently or temporarily in the desired section. These chips may be deigned to last for extended time and different concentrations.

The method of enhancing the productivity, injectivity, and sweep efficiency of a subterranean wellbore production described in the previous paragraphs may be applied to injection well, a production well, a deep well, a shallow single well, a shallow multilateral well, a vertical well, or a horizontal well having one or more compartments.

In horizontal wells having multiple compartments, each compartment may include a screen having a surface that may be coated with a composition containing a basaltic base fluid. According to one or more embodiments, when a water shut off is needed to equalize the flow and avoid immature breakthrough, a carbonated mixture may be injected reacting with the basaltic particles in the target compartment or target zone, mineralizing and plugging the zone.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method of enhancing productivity of a subterranean wellbore, the method comprising:
   introducing a carbonated mixture comprising water and carbonate anions to a target zone of the subterranean wellbore;
   introducing basaltic particles to the target zone of the subterranean wellbore;
   contacting the basaltic particles with the carbonated mixture;
   dissolving at least a part of the basaltic particles with the carbonated mixture to release divalent cations including calcium cations, magnesium cations and ferrous cations;
   reacting, in the target zone of the subterranean wellbore, the divalent cations with the carbonate anions in the carbonated mixture to produce carbonate minerals;
   providing stimulus to the basaltic particles and the carbonated mixture to promote the dissolving and the reacting;
   depositing at least a part of the carbonate minerals to fractures of the target zone;
   monitoring the reacting of the divalent cations with the carbonated anions and depositing; and
   optionally repeating one or more of the introducing the basaltic particles, the introducing the carbonated mixture, the dissolving, the reacting, the providing the stimulus, the depositing, and the monitoring,
   wherein the carbonate anions are formed by dissolving carbon dioxide in water,
   wherein the stimulus comprises at least one of infrasonic wave, acoustic wave, ultrasonic wave, and microwave.

2. The method of claim 1, wherein the carbonated mixture is injected into the target zone of the subterranean wellbore before the basaltic particles.

3. The method of claim 1, wherein the basaltic particles are injected into the target zone of the subterranean wellbore before the carbonated mixture.

4. The method of claim 1, wherein the basaltic particles and the carbonated mixture are injected simultaneously into the target zone of the subterranean wellbore.

5. The method of claim 1, wherein the basaltic particles are nanoparticles.

6. The method of claim 1, wherein a size of the basaltic particles is in a range from 1 nm to 20 mm.

7. The method of claim 1, wherein the step of introducing the basaltic particles comprises introducing a fluid comprising the basaltic particles.

8. The method of claim 1, wherein the step of introducing the basaltic particles comprises introducing the basaltic particles into an injection well or a production well.

9. The method of claim 1, wherein the step of introducing the basaltic particles comprises introducing the basaltic particles into a deep well.

10. The method of claim 1, wherein the step of introducing the basaltic particles comprises introducing the basaltic particles into a shallow single well.

11. The method of claim 1, wherein the step of introducing the basaltic particles comprises introducing the basaltic particles into a shallow multilateral well.

12. The method of claim 1, wherein the step of introducing the basaltic particles comprises introducing the basaltic particles into a vertical well.

13. The method of claim 1, wherein the step of introducing the basaltic particles comprises introducing the basaltic particles into a horizontal well.

14. The method of claim 1, wherein the step of introducing the basaltic particles comprises introducing the basaltic particles into a well comprising one or more compartments.

15. The method of claim 14, wherein the step of introducing the basaltic particles comprises coating a surface of at least one of the one or more compartments of the horizontal well with a coating composition comprising the basaltic particles.

16. The method of claim 1, wherein the carbonated mixture is injected via an injection well or a production well.

17. The method of claim 1, wherein the carbonated mixture has a pH from 2.0 to 6.9.

18. The method of claim 1, wherein the carbonate minerals include calcium carbonate, magnesium carbonate and ferrous carbonate.

19. The method of claim 1, wherein the stimulus is provided by at least one of infrasonic generator, acoustic wave generator, ultrasonic generator, and a microwave generator.

20. The method of claim 1, wherein the method is conducted without stopping a production operation or with a minimal disruption to the production operation.

* * * * *